United States Patent
Lemke

(12) 
(10) Patent No.: US 10,727,637 B2
(45) Date of Patent: Jul. 28, 2020

(54) CUTTING FIXTURE EXHIBITING RAM ACTUATED AND MULTIPLYING LEVER FORCE FOR REMOVING SUCH AS AN H-TAP CRIMP FROM A UTILITY POWER LINE

(71) Applicant: Jeffrey C. Lemke, Holly, MI (US)

(72) Inventor: Jeffrey C. Lemke, Holly, MI (US)

( * ) Notice: Subject to any disclaimer, the term of this patent is extended or adjusted under 35 U.S.C. 154(b) by 0 days.

(21) Appl. No.: 16/233,172

(22) Filed: Dec. 27, 2018

(65) Prior Publication Data

US 2019/0207356 A1 Jul. 4, 2019

Related U.S. Application Data

(60) Provisional application No. 62/612,902, filed on Jan. 2, 2018.

(51) Int. Cl.
| | |
|---|---|
| *H01R 43/042* | (2006.01) |
| *B26D 1/30* | (2006.01) |
| *H02G 1/00* | (2006.01) |
| *H02G 15/02* | (2006.01) |

(52) U.S. Cl.
CPC .......... *H01R 43/0421* (2013.01); *B26D 1/30* (2013.01); *H02G 1/005* (2013.01); *H02G 15/02* (2013.01)

(58) Field of Classification Search
CPC ...... H01R 12/716; H01R 43/16; H01R 43/24; H01R 43/0421; Y10T 29/4922; B26D 1/30; H02G 1/005; H02G 15/02
USPC ...... 30/228; 83/630, 632; 254/93 R; 269/43, 269/156, 228
See application file for complete search history.

(56) References Cited

U.S. PATENT DOCUMENTS

| | | | | |
|---|---|---|---|---|
| 2,254,613 | A * | 9/1941 | Matthysse | H01R 43/0427 72/453.16 |
| 2,318,982 | A * | 5/1943 | Wilhide | B23D 29/00 30/228 |
| 2,384,130 | A * | 9/1945 | Pell | B23D 21/00 83/564 |
| 2,442,063 | A | 5/1948 | Stone | |
| 2,578,582 | A * | 12/1951 | Northcutt | B23D 21/00 30/241 |

(Continued)

FOREIGN PATENT DOCUMENTS

| | | | | |
|---|---|---|---|---|
| EP | 3333993 A1 * | 6/2018 | | B25B 27/14 |
| WO | WO-2016112153 A2 * | 7/2016 | | H02G 1/005 |

*Primary Examiner* — Ghassem Alie
*Assistant Examiner* — Bharat C Patel
(74) *Attorney, Agent, or Firm* — Dinsmore & Shohl LLP

(57) ABSTRACT

A cutting fixture for incising a tap portion installed between a pair power cables. A fixture body is mounted atop a power press tool in contact with a linearly advancing ram of the tool. The fixture body terminates in a downwardly facing support surface. A pair of levers are pivotally mounted to the fixture body, each including a bottom end profile and a roller at an upper end which, in response to upward displacement of the ram, multi-directionally advances to displace against an underside of a linearly movable carriage supported upon the fixture body in proximity to the levers. A cutting blade is supported upon the carriage and, in response to elevation of the carriage, displaces upwardly in a force multiplying fashion to section the H-tap positioned between the carriage and the downwardly facing support surface in order to permit its removal while preserving the integrity of the cables.

13 Claims, 6 Drawing Sheets

(56) References Cited

U.S. PATENT DOCUMENTS

| | | | | |
|---|---|---|---|---|
| 3,763,738 A | * | 10/1973 | Temple | B23D 15/145 89/1.14 |
| 3,861,035 A | * | 1/1975 | Ramey | B23D 15/145 30/92 |
| 4,292,833 A | * | 10/1981 | Lapp | H02G 1/00 72/409.01 |
| 4,587,732 A | * | 5/1986 | Lind | B23D 23/00 137/635 |
| 4,734,983 A | * | 4/1988 | Brick | B23D 17/06 30/228 |
| 5,487,297 A | * | 1/1996 | Ryan | H01R 43/042 29/243.56 |
| 5,722,170 A | * | 3/1998 | Smith | B23D 15/145 227/10 |
| 5,875,554 A | | 3/1999 | Vogelsanger | |
| 6,092,290 A | | 7/2000 | Vogelsanger | |
| 6,119,502 A | * | 9/2000 | Buchmayer | H01R 43/0427 29/751 |
| 6,308,417 B1 | | 10/2001 | Ducret | |
| 6,349,474 B1 | * | 2/2002 | Jordan | B23D 15/145 30/228 |
| 6,792,789 B1 | * | 9/2004 | Faucher | B21D 39/048 72/409.16 |
| 7,971,359 B2 | * | 7/2011 | Bzorgi | B23D 29/00 30/180 |
| 8,342,001 B2 | * | 1/2013 | Zhang | B23D 29/00 29/751 |
| 9,272,477 B2 | * | 3/2016 | Kasai | B25B 27/10 |
| 2003/0172705 A1 | * | 9/2003 | Liang | B25B 27/146 72/324 |
| 2013/0276313 A1 | | 10/2013 | Zhou et al. | |
| 2015/0033817 A1 | * | 2/2015 | Kasai | B25B 27/10 72/453.16 |
| 2017/0040781 A1 | * | 2/2017 | Brown | H02G 1/005 |
| 2017/0165856 A1 | * | 6/2017 | Barezzani | H02G 1/005 |
| 2018/0083403 A1 | * | 3/2018 | Pletsch | H01R 43/0421 |
| 2018/0337504 A1 | * | 11/2018 | Larsson | H01R 43/0486 |

* cited by examiner

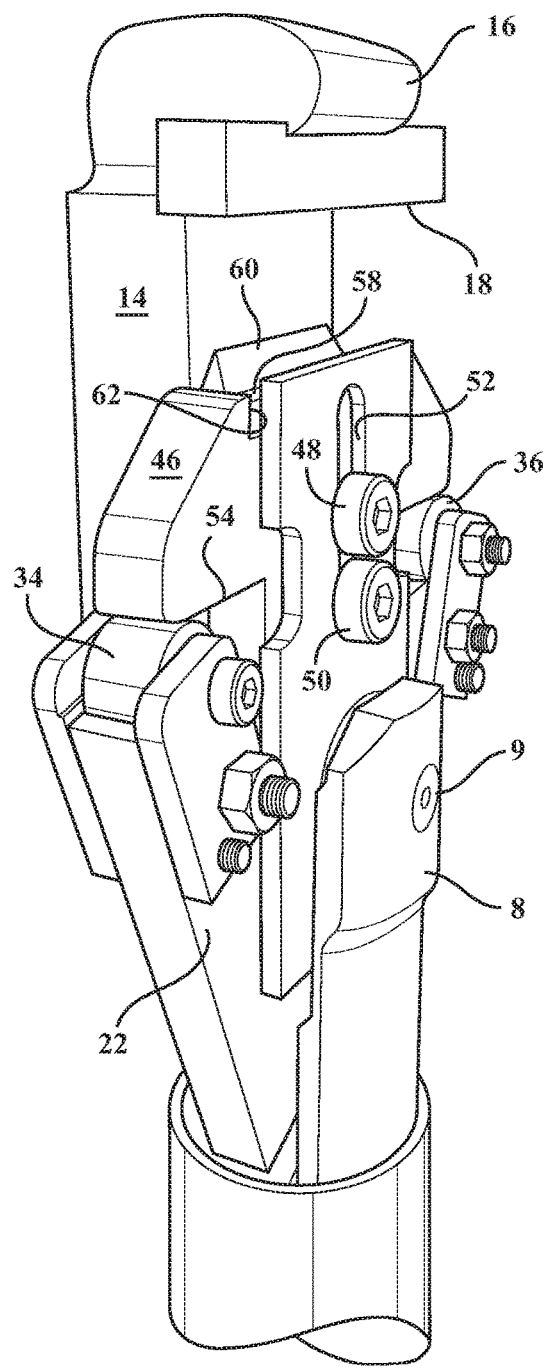
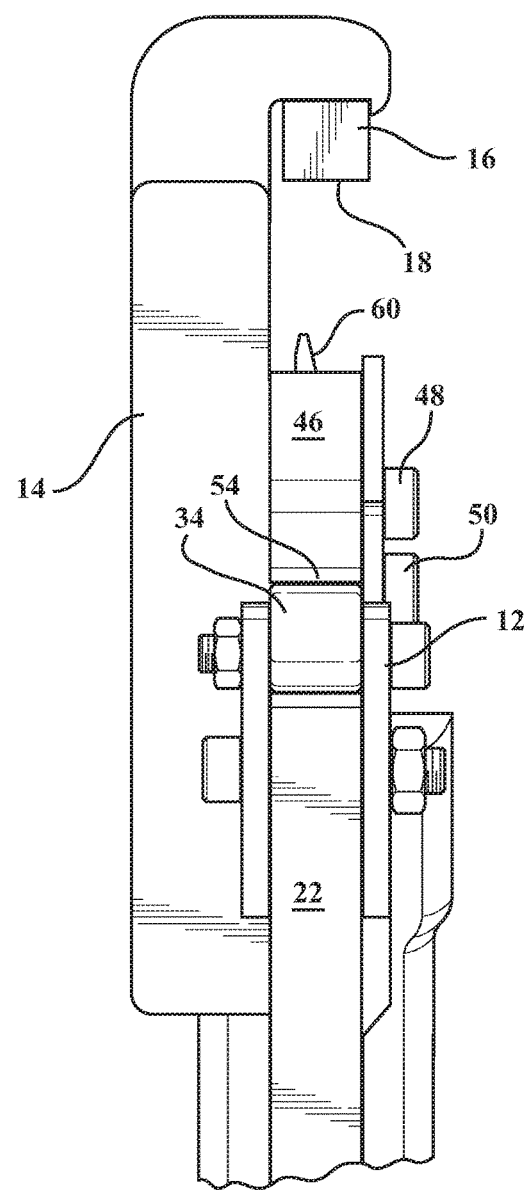
FIG. 4
FIG. 5

CUTTING FIXTURE EXHIBITING RAM ACTUATED AND MULTIPLYING LEVER FORCE FOR REMOVING SUCH AS AN H-TAP CRIMP FROM A UTILITY POWER LINE

CROSS REFERENCE TO RELATED APPLICATIONS

The present application claims priority from U.S. Ser. No. 62/612,902, filed Jan. 2, 2018.

FIELD OF THE INVENTION

The present invention relates generally to a cutting fixture mounted to portable hand-held press exhibiting a linearly advancing ram portion. More specifically, the present invention teaches such a cutting fixture mounted atop a portable press and incorporating a pair of roller supported and force multiplying levers, actuation of which in turn linearly driving a carriage supporting a cutter blade. An H-tap, previously crimped about a conductive joining location established between main and feed copper lines supported within the fixture, is positioned between the carriage/blade and opposing support surfaces and, upon advancing the carriage supported blade, causes incising of the H-tap at a crimp location to effect removal of the tap without damage to the copper lines. The cutter blade is further repositionable between the movable carriage and the opposing support surface in order to adapt the fixture and portable power press tool for convenience of usage by such as a utility technician supported in a basket elevated location when operating on power lines or the like.

BACKGROUND OF THE INVENTION

The prior art is documented with examples of hand held power tools, such as which can include a cordless/hand linearly driven press ram for pivotally actuating a crimping fixtures, this in order to install such as a conductive H-tap for directing power from a main overhead copper cable to a take off or supply cable.

Ducret, U.S. Pat. No. 6,308,417 teaches a cable stripper tool enabling an operator to quickly change from making a circumferential cut of a cable to a liner cut without repositioning the cable stripper tool on the cable includes a blade positioning assembly, a blade penetration assembly and a cable guide assembly. The blade positioning assembly is adopted to efficiently move the blade linearly for penetrating the insulation at a predetermined distance set by the dial assembly while the tool is clamped to the cable to perform a circumferential cut upon relative rotation of the tool and the cable. The blade further is retracted to be turned by the blade positioning assembly at a 90° angle with a rotary cam action to be further axially propelled to penetrate the cable at the same predetermined distance to perform a linear cut without dismounting the cable.

Other powered tools include the portable rescue tools of Vogelsanger, U.S. Pat. Nos. 6,092,290 and 5,875,554. In each instance, these include a hydraulic motor, battery operated fluid pump and operational controls. Pivotal cutting blades are configured in rongeur (biting) fashion for successively incising portions from the material being removed.

A similar powered cutting tool is depicted in Zhou, US 2013/0276313, which teaches a cutting head, a motor and a transmission means drivable by the motor. The cutting head includes first and second cutting members, wherein the first cutting member is pivotably moveable with respect to the second cutting member. At least the first cutting member is drivable by the transmission means between a first angular position with respect to the second cutting member and a second angular position with respect to the second cutting member, in which a space between the respective cutting blades is closed. The transmission means is a bevel gear on the output shaft of a gearbox which conveys drive power from the motor to the drive gear. The bevel gear directly engages a bevel wheel member connected to the first cutting member and which swivels with the first cutting member about the same swivel point. A controller comprises main, first and second switches which control the motor to move the first cutting member (movable blade). The main switch acts as a main power switch whereas the first ad second switches act as limit switches detecting movement of said movable blade at the limits of its intended motion. The controller exerts automatic control over movement of the first cutting member in response to inputs from the first and second limit switches.

U.S. Pat. No. 4,734,983, to Brick, teaches a power cutting tool with a single movable blade positioned relative to a stationary blade. The movable blade is curved, and is mounted so as to close onto the stationary blade. The curvature of the movable blade is such that its initial contact with the stationary blade occurs at its free end. The stationary blade is formed on an anvil, anchored within the frame of the tool. The anvil is sufficiently long that its end extends beyond the end of the movable blade. The anvil is anchored within a slot formed in the cover portion of the frame, and is locked into position with a dowel. The mounting of the anvil within the slot is such that the forces exerted on the blade are directed against the heavy cover, and not against the dowel.

SUMMARY OF THE INVENTION

The present invention teaches a cutting fixture mounted atop a portable press for quickly and effectively incising such as an H-tap or other conductive component which may have been previously crimp-installed between a pair of main and take off copper power cables, such permitting the removal of a corroded or otherwise, compromised tap while preserving the integrity of the existing power cables. The fixture is mounted atop a conventional and linearly ram driven tool (such a portable Lithium Ion powered tool with a linearly advancing press according to a given rating).

The fixture incorporates main body mounted to an end of the hand-held press in proximity to the linearly advancing ram. A pair levers are pivotally mounted at lower end locations of the main fixture body and extend in outwardly angled directions. The levers each include a bottom end surface configured profile which, in response to upward displacement of the ram, is caused to actuate each of the levers in a concurrent inward direction towards the main body.

Upper ends of each pivoting lever further includes a heavy duty and bearing supported roller which advances axially relative to a centerline extending through the elongated body of the hand held press, concurrent with being pivotally retracted toward the main supporting body of the fixture. A linearly movable carriage is supported upon the body in proximity to the levers and includes a bottom surface adapted to be engaged by the rollers.

An insert including cutting blade is positioned atop the carriage in a first variant, and in response to simultaneous inward and concurrent upward axial motion of the rollers, is caused to be displaced upwardly in a force multiplying fashion (as opposed to being directly and axially displaced by the ram without the benefit of the force multiplying levers). The H-tap, previously crimped about a conductive joining location established between the main and feed copper lines supported within the fixture, is positioned between the carriage/blade and opposing upper end support surfaces and, upon advancing the carriage supported blade, causes incising of the H-tap at a crimp location to effect removal of the tap without damage to the copper lines.

The cutter insert and blade is further repositionable between the movable carriage and the opposing end support surface, such that the upper surface of the carriage can be re-purposed as a movable anvil support in a direction towards a fixed blade. In this fashion, the fixture and portable power press tool provides for convenience of usage by such as a utility technician supported in a basket elevated location when operating on power lines or the like.

BRIEF DESCRIPTION OF THE DRAWINGS

Reference will now be made to the attached drawings, when read in combination with the following detailed description, wherein like reference numerals refer to like parts throughout the several views, and in which:

FIG. 4 is a rotated perspective of the cutting fixture depicted in FIG. 3;

FIG. 5 is a side rotated view of the cutting fixture and better illustrating the profile of the cutting insert and blade relative to the upper end and downwardly opposing support surface;

DETAILED DESCRIPTION OF THE PREFERRED EMBODIMENTS

With reference to the attached illustrations, the present invention discloses a cutting fixture, generally at 10, mounted atop a portable press 2 for quickly and effectively incising a conductive component, such as in particular an H-tap 3 (see FIGS. 8-9) which may have been previously crimp-installed between a pair of main 4 and take off 5 power cables, such as which can further include any of a copper, aluminum or other conductive material from which it is desirable to remove the H-tap. As will be described, the cutting tool permits the removal of a corroded or otherwise, compromised tap while preserving the integrity of the existing power cables 4-5 (again FIGS. 8 and 9).

Figure 1:
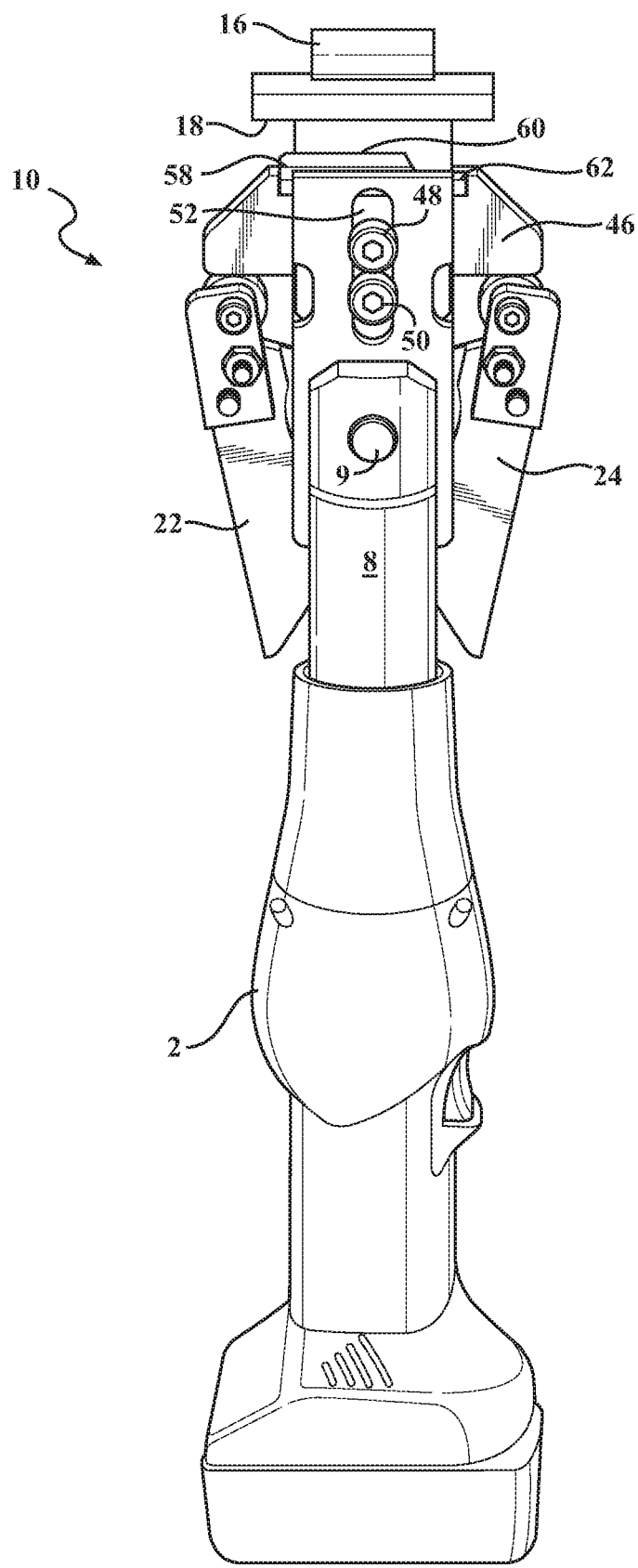
FIG. 1 is an illustration of the portable ram tool and attachable cutting fixture according to the present invention.
Figure 2:
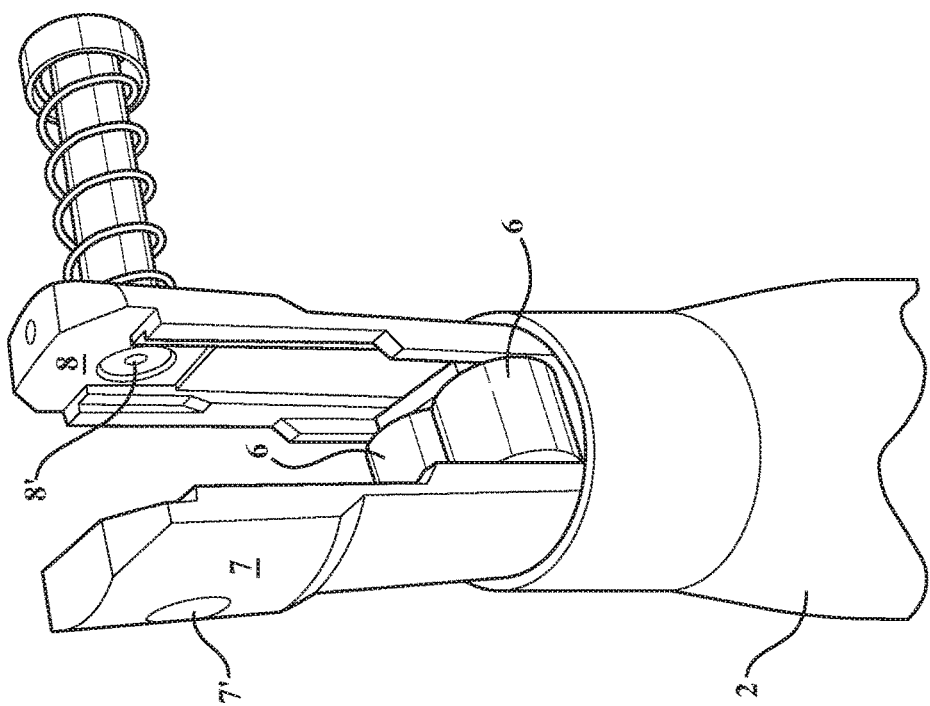
FIG. 2 is an upper end perspective of the portable ram power tool and illustrating a linear ram displacing component along with a mounting bracket for receiving the cutting fixture.

Referring to FIGS. 1-2, the fixture 10 and associated components are constructed of a heavy duty steel grade material and which is mounted atop a conventional and linearly ram driven tool defining on portion of a portable press 2 (such being a portable Lithium Ion powered tool with a linearly advancing press according to a given rating). FIG. 2 is an upper end perspective illustration of the portable ram power tool and illustrating a linear ram displacing component (see pair of elevate-able components 6 and 6') along with a mounting bracket (lobes or stems 7 and 8) for receiving the cutting fixture. A pin 9 is provided in crosswise installation fashion proximate an upper end of the split lobes of the portable press and, upon installation of the cutting fixture 10 as will be further described, is spring loaded through apertures (see at 7' and 8') in the bracket lobes 7 and 8 for mounting the fixture (via an aligning aperture) atop the portable press so that actuation of the elevate-able ram elements 6 and 6' contact lower locations of the cutting fixture levers to cause actuation of the cutting blade component of the fixture 10 in the manner described below.

Figure 6B:
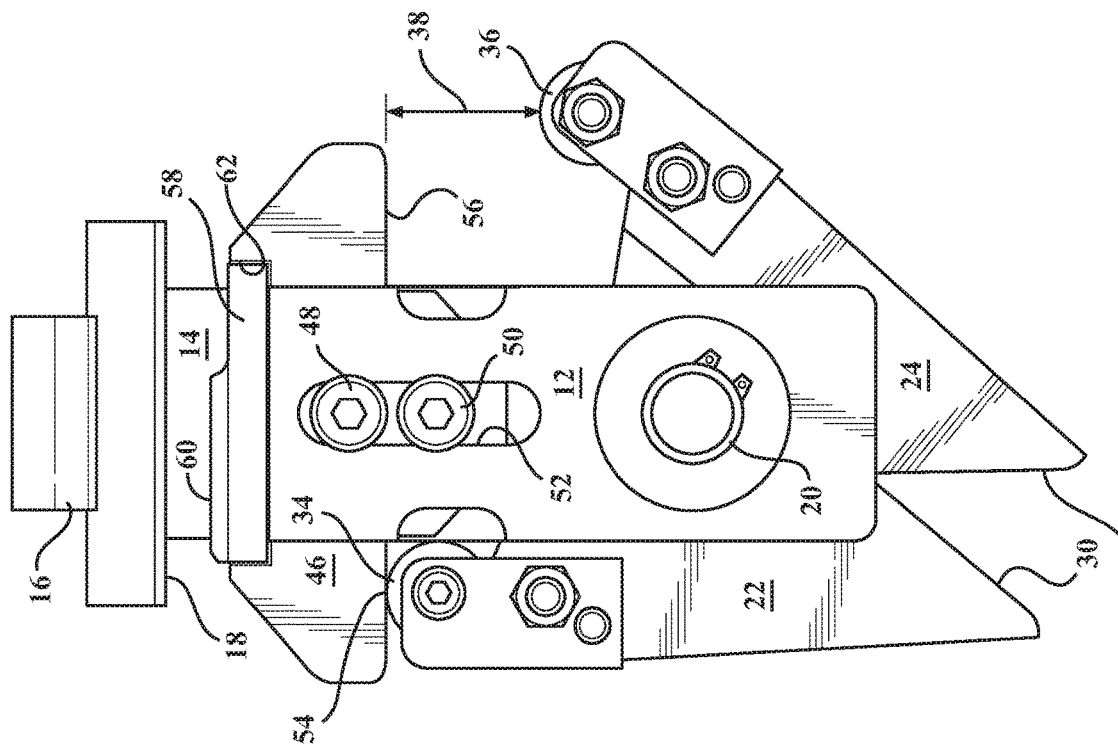
FIGS. 6B and 6C illustrate a range of pivotal motion of selective levers in comparison to fully retracted levers in order to illustrate a linear component of displacement thereof.
Figure 6A:
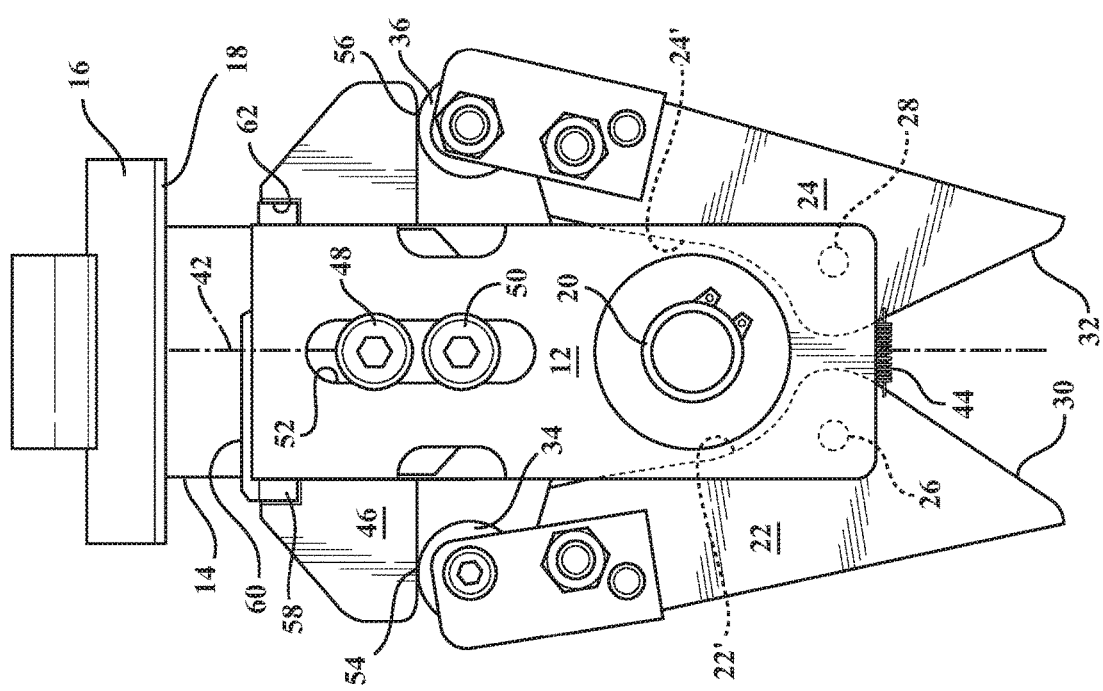
FIG. 6A is a detached plan view of the cutting fixture and better illustrating the inside tapering edges of lower portions of the pivot levers which, in response to being contacted by the upwardly displacing ram portion of the power tool, causing inward/upward displacement of the upper lever portions and drive rollers.
Figure 7:
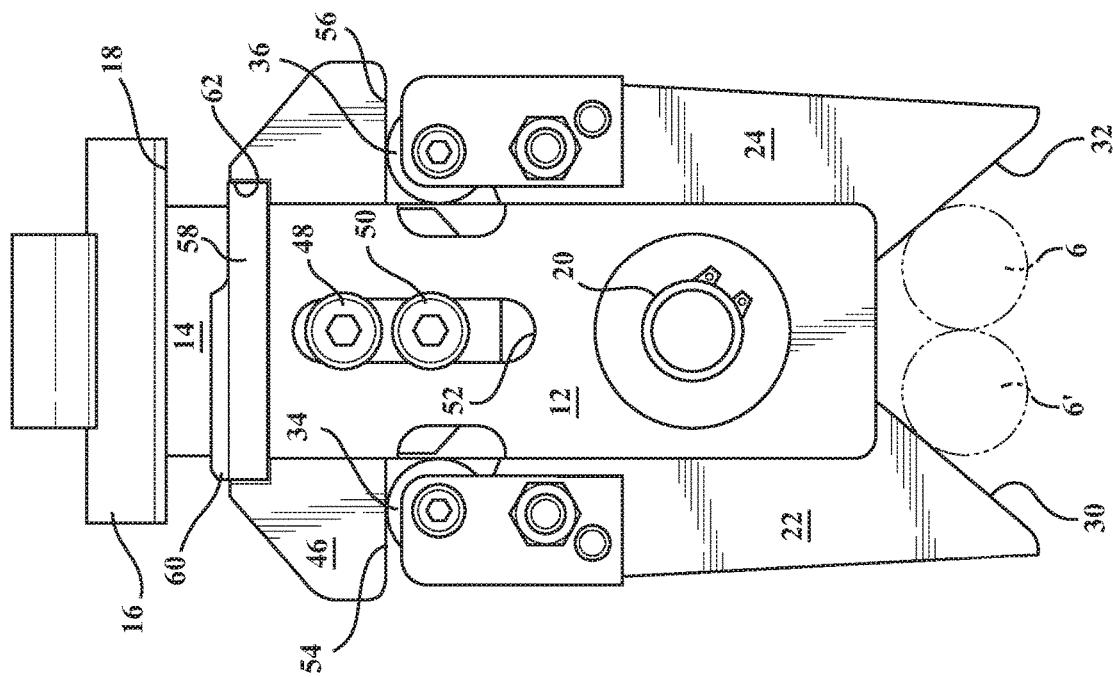
FIG. 7 illustrates a substantially and fully upwardly displaced position of the linearly displaceable carriage.

With reference in succession to FIGS. 3-7, the cutting fixture 10 incorporates a fixture body which is generally "U" shaped with a front plate 12, a bottom (hidden from view) and an upwardly extending rear superstructure 14 which is spaced a distance from the front plate and which terminates a top end in a downwardly facing anvil 16 with a downwardly configured surface 18. An aperture, see at 20 in FIGS. 6A-7, is configured into the lower locations of the front plate 12 and rear spaced superstructure 14 in alignment with the apertures in the mounting bracket lobes for receiving the installation pin 9 to mounted to the upper end of the hand-held press in proximity to the linearly advancing ram components 6A.

A pair levers 22 and 24 are pivotally mounted at lower end locations of the main fixture body (between front plate 12 and rear spaced superstructure 14) and so that upper most ends of the levers extend in outwardly angled directions when in a lower position. Although largely hidden from view, the lower ends of the levers 22/24 can include pivot mount locations 26/28, depicted in phantom in FIG. 6 in hidden fashion between the front plate 12 and rear superstructure 14 and which can include pins or the like which pivotally secure the levers between the front plate and base superstructure.

The levers each include a bottom end surface configured profile, see angled inside bottom surfaces 30/32 (FIG. 6A et seq.) which, in response to upward displacement of the ram (see components 6 and 6' in elevating contact as shown in phantom in FIG. 7 in the direction of elevating arrow 39), is caused to actuate each of the levers 22/24 in a concurrent inward direction towards the main body (i.e. towards an interior pocket established between the front plate 12 and rear superstructure 14.

Figure 6C:
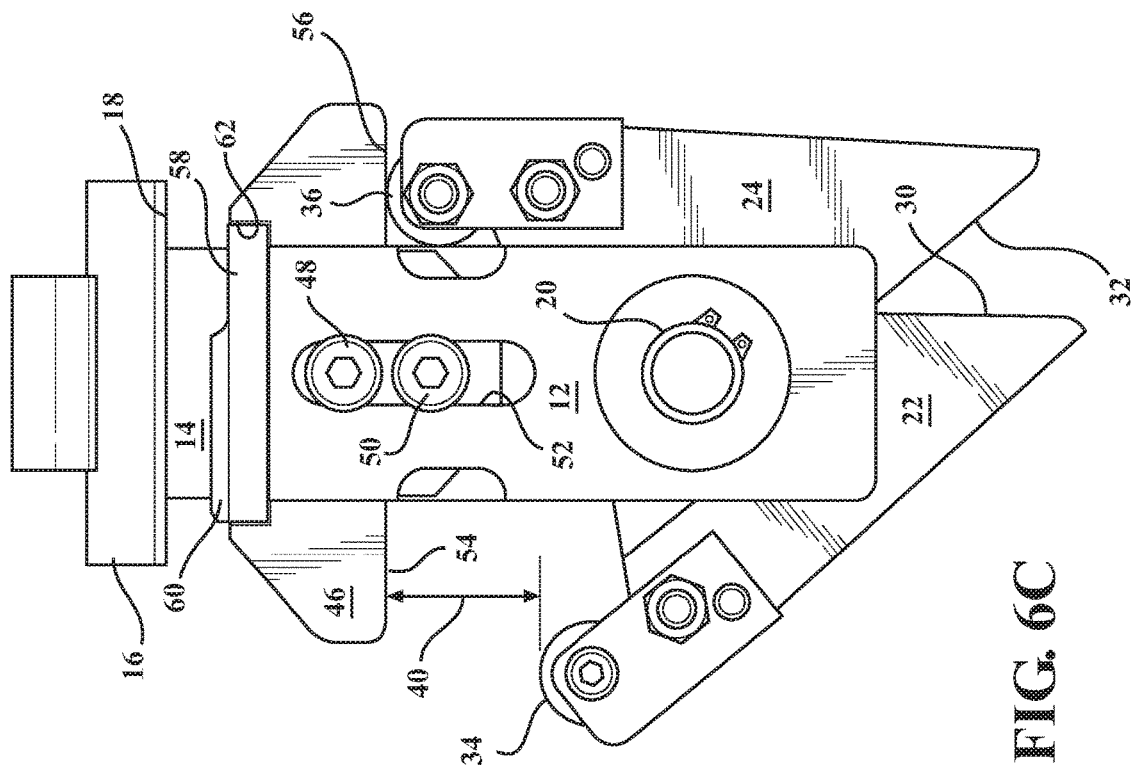

Upper ends of each pivoting lever further includes a heavy duty and bearing supported roller, at 34/36, which advances axially (see overall axial length components 38 and 40 depicted in FIGS. 6B and 6C respectively, these defined between outward most pivoted (lowermost) roller and uppermost inwardly pivoted/upwardly displaced rollers, relative to a centerline (see at 42 in FIG. 6A) extending through the elongated body of the hand held press, concurrent with being pivotally retracted toward the interior pocket defined within the main supporting body of the fixture.

As also shown in FIG. 6A, a biasing element (such as a coil spring 44) can be pinned between the lower-most locations of the levers (below the pivot locations 26/28) in order to bias the levers in the position shown in FIG. 6A. Also shown in FIG. 6A in phantom at 22' and 24' is a profile of the inner edge of the levers 22 and 24 configured so as not to interfere with the installation pin 9 and receiving aperture 20 in the front plate 12.

A linearly movable carriage 46 is supported upon the body, via a pair of pins 48 and 50 which project from a base location of the carriage and seat through a slot 52 defined in the front plate 12, this in proximity to the levers. As shown, underside corner surface locations of the upper carriage, see at 54 and 56, define bottom surfaces adapted to be engaged by the rollers 34/36 and serve to translate the carriage in a bi-directional linear direction as dictated by the centerline 42.

Figure 8:
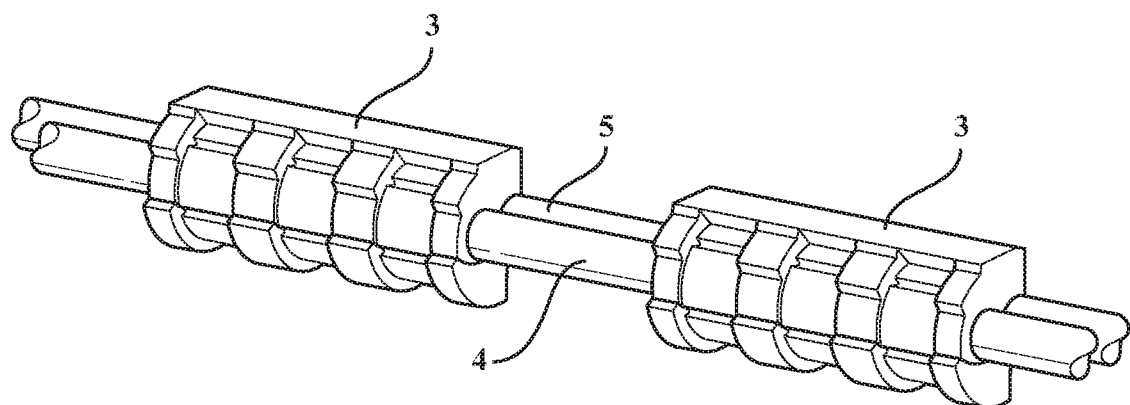
FIGS. 8-9 illustrate first and second views of a power cable and H-tap including a cutting profile resulting from use of the cutting jig fixture.
Figure 9:
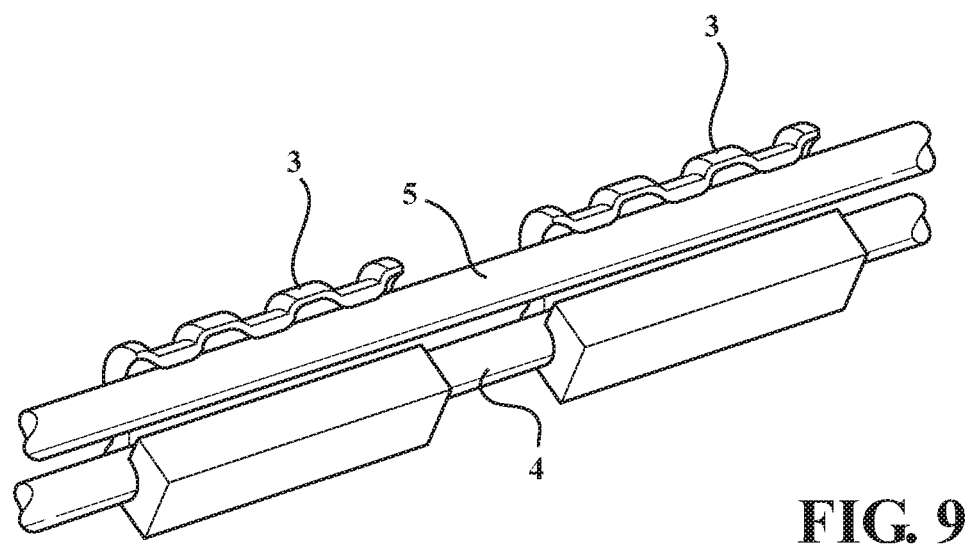

An insert 58 including a cutting blade 60 is positioned atop the carriage 46 (via a pocket 62 configured within an upper facing interior surface thereof) in a first variant, and in response to simultaneous inward and concurrent upward axial motion of the rollers 34/36, is caused to be displaced upwardly in a force multiplying fashion (as opposed to being directly and axially displaced by the ram without the benefit of the force multiplying levers). This is best depicted in FIGS. 6A-6B and 7 when viewed in succession and which again utilizes the force multiplying or magnifying effect of the rollers acting upon the carriage at the opposing underside outer locations in opposing directions towards the interior of the main cutting fixture body, thereby providing the requisite upward driving force of the carriage/cutting insert, for sectioning the H-taps 3 as depicted in FIGS. 8-9.

Figure 3:
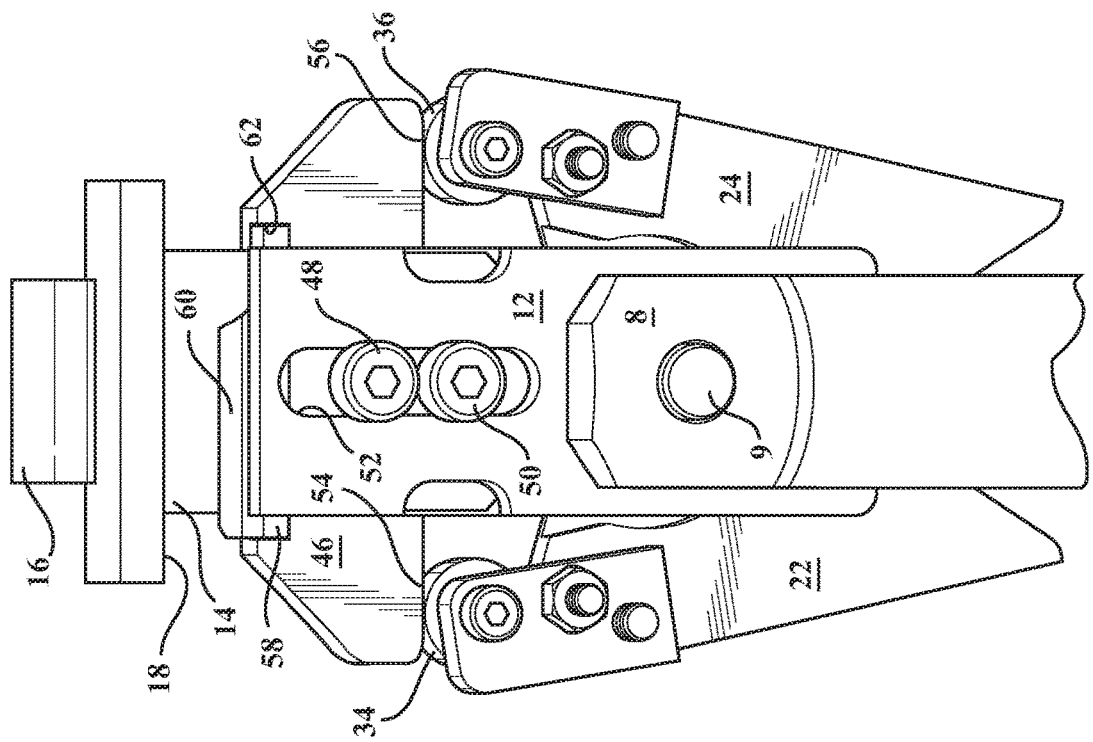
FIG. 3 is an illustration of the cutting fixture including the features of the main body with upper platen/anvil supporting end, pivot levers with rollers and vertically actuated band blade supporting carriage.

As previously described, the H-taps can be conventionally crimped about a conductive joining location established between the main 4 and feed 5 copper lines supported within the fixture and, as best viewed from the tool orientation of FIG. 3, is positioned between the carriage/blade and opposing upper end support surfaces so that, upon advancing the carriage supported blade 60, causes incising of the H-tap at a crimp location to effect removal of the tap without damage to the copper lines.

As described, the cutter insert and blade may further be repositionable between the movable carriage and the opposing end support surface 18 (this can include configuring a similar underside pocket matching that shown at 62 associated with the upper surface of the carriage 46 and which can also include a removable insert to maintain a smooth underside profile in instances where the cutter insert and blade are supported upon the carriage). In this fashion, the upper surface of the carriage can be re-purposed as a movable anvil support in a direction towards a fixed blade. The fixture and portable power press tool additionally provides for convenience of usage by such as a utility technician supported in a basket elevated location when operating on power lines or the like and to avoid the necessity of the technician having to re-orient the portable ram press and cutting fixture to access a given crimp location.

Having described my invention, other and additional preferred embodiments will become apparent to those skilled in the art to which it pertains, and without departing from the scope of the appended claims. This can include mounting the cutting fixture 10 to other ram press operations, fixed, portable or otherwise, and in order to section a desired material supported between the carriage and underside upper end of the fixed main body, such according to the operational stroke enabled by upward pivoting of the carriage according to the vertical stroke length (see again at 38 and 40 FIGS. 6B and 6C).

The invention claimed is:

1. A cutting fixture mounted upon a linear ram power tool for incising a tap installed between a pair of main and take off cable power cables, comprising: a fixture body adapted to being mounted atop the power tool in contact with a linearly advancing ram of the power tool, said fixture body terminating in an upper end defining a downwardly facing support surface of an anvil
    a pair of levers pivotally mounted to said fixture body, upper ends of said levers each including a roller, said levers each including a bottom end profile which, in response to upward displacement of the ram, causes said rollers supported at said upper ends of said levers to actuate in opposing and inward directions relative to an axial centerline extending through said fixture body;
    a carriage supported upon said fixture body in proximity to said levers, said carriage including a pair of lateral bottom surfaces extending in opposite directions from said axial centerline such that said carriage is directly engaged by said rollers, said carriage including an upwardly facing support surface opposing said downwardly facing support surface of said fixture body adapted to support the cables and the tap therebetween; and
    a cutting blade supported between said carriage and said downwardly facing support surface and, in response to elevation of said carriage, causing said rollers to concurrently and inwardly displace along said lateral bottom surfaces of said carriage in directions toward said centerline for sectioning the tap from the cables to permit removal of the tap while preserving the integrity of the cables.

2. The invention as described in claim 1, further comprising a pocket configured within said upwardly facing support surface of said carriage and receiving an insert incorporating said cutting blade.

3. The invention as described in claim 1, further said blade being incorporated into said downwardly facing support surface and opposing said upwardly facing support surface which functions as a movable anvil support surface.

4. The invention as described in claim 1, further comprising a pair of pins projecting from a base location of said carriage and seating through a slot defined in a front plate of said fixture body in proximity to said levers.

5. A cutting fixture mounted upon a linear actuating hand held power tool for incising a tap installed between a pair of main and take off cable power cables, said fixture comprising:
    a fixture body adapted to being mounted to an end of the hand-held tool in proximity to a linearly advancing ram, said fixture body terminating in an upper end defining a downwardly facing support surface of an anvil;
    a pair of levers pivotally mounted at lower end locations of said fixture body and extending in outwardly angled directions, said levers each including a bottom end surface configured profile which, in response to upward displacement of power tool ram, is caused to actuate in a concurrent inward direction towards an axially directed centerline extending through said fixture body;
    upper ends of each pivoting lever further including a roller which advances axially relative to the centerline, concurrent with being pivotally retracted toward said fixture body;

a carriage supported upon said fixture body in proximity to said levers and including a pair of lateral bottom surfaces extending in opposite directions from said axially directed centerline such that said carriage is directly engaged by said rollers, said carriage including an upwardly facing support surface opposing said downwardly facing support surface of said fixture body and adapted to support the tap and conductive portions of the cables positioned therebetween; and a cutting blade positioned between said carriage and downwardly opposing facing support surface and, in response to elevation of said carriage, causing said rollers to concurrently and inwardly displace along said lateral bottom surfaces of said carriage in directions toward said centerline for exerting a force multiplier to section the tap from the cables to permit removal of the tap while preserving the integrity of the cables.

6. The invention as described in claim 5, further comprising said cutting blade being incorporated into an insert positioned atop said carriage by seating said insert into a pocket configured within an upper facing interior surface of said carriage.

7. The invention as described in claim 5, further said blade being incorporated into said downwardly facing support surface and opposing said upwardly facing support surface which functions as a movable anvil support surface.

8. The invention as described in claim 5, further comprising a pair of pins projecting from a base location of said carriage and seating through a slot defined in a front plate of said fixture body in proximity to said levers.

9. An assembly for incising a tap installed between a pair of main and take off cable power cables, said assembly comprising:

a hand-held power tool having a tool body supporting a linearly advancing ram;

a fixture body mounted atop said tool body, such that said ram is elevate-able in a direction toward said fixture body;

said fixture body terminating in an upper end defining a downwardly facing support surface of an anvil;

a pair of levers pivotally mounted at lower end locations of said fixture body and extending in outwardly angled directions, said levers each including a bottom end surface configured profile which, in response to upward displacement of said ram, is caused to actuate in a concurrent inward direction towards an axial extending centerline of said fixture body;

upper ends of each pivoting lever further including a roller which advances axially relative to the centerline, concurrent with being pivotally retracted toward the centerline of the fixture body;

a carriage supported upon the fixture body in proximity to said levers and including a pair of lateral bottom surfaces extending in opposite directions from said axial centerline such that said carriage is directly engaged by said rollers, said carriage including an upwardly facing support surface opposing said downwardly facing support surface of the said fixture body and adapted to support the tap and cables therebetween; and a cutting blade positioned between said carriage and downwardly opposing facing support surface and, in response to elevation of said carriage, causing said rollers to concurrently and inwardly displace along said lateral bottom surfaces of said carriage in directions toward said centerline for exerting a force multiplier to section the tap from the cables to permit removal of the tap while preserving the integrity of the cables.

10. The assembly as described in claim 9, further comprising said cutting blade being incorporated into an insert positioned atop said carriage by seating said insert into a pocket configured within an upper facing interior surface of said carriage.

11. The assembly as described in claim 9, further said blade being incorporated into said downwardly facing support surface and opposing said carriage which functions as a movable anvil support surface.

12. The assembly as described in claim 9, said power tool further comprising a pair of split mounting lobes for receiving said cutting fixture.

13. The assembly as described in claim 9, further comprising aligning apertures configured within said lobes and said fixture body and receiving a crosswise inserted pin.

* * * * *